United States Patent
Jung et al.

(10) Patent No.: US 12,482,855 B2
(45) Date of Patent: Nov. 25, 2025

(54) SOLID-STATE BATTERY

(71) Applicant: LG Energy Solution, Ltd., Seoul (KR)

(72) Inventors: Hye-Ri Jung, Daejeon (KR); Jung-Pil Lee, Daejeon (KR); Hoe-Jin Hah, Daejeon (KR); Hyea-Eun Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 558 days.

(21) Appl. No.: 17/922,574

(22) PCT Filed: Sep. 3, 2021

(86) PCT No.: PCT/KR2021/011977
§ 371 (c)(1),
(2) Date: Oct. 31, 2022

(87) PCT Pub. No.: WO2022/055189
PCT Pub. Date: Mar. 17, 2022

(65) Prior Publication Data
US 2023/0275260 A1    Aug. 31, 2023

(30) Foreign Application Priority Data
Sep. 9, 2020    (KR) .......... 10-2020-0115643

(51) Int. Cl.
*H01M 10/0562* (2010.01)

(52) U.S. Cl.
CPC .. *H01M 10/0562* (2013.01); *H01M 2300/008* (2013.01); *H01M 2300/0094* (2013.01)

(58) Field of Classification Search
CPC ......... H01M 10/0562; H01M 10/0585; H01M 10/0052; H01M 2300/0094; H01M 2300/0068; Y02E 60/10
See application file for complete search history.

(56) References Cited

U.S. PATENT DOCUMENTS

| | | |
|---|---|---|
| 2009/0011338 A1 | 1/2009 | Kimura |
| 2015/0147659 A1 | 5/2015 | Kato |
| 2016/0380301 A1 | 12/2016 | Kosaka et al. |
| 2017/0263977 A1 | 9/2017 | Jeon et al. |
| 2018/0159169 A1 | 6/2018 | Ko et al. |
| 2020/0052327 A1 | 2/2020 | Osada |
| 2020/0144575 A1 | 5/2020 | Ku et al. |
| 2021/0028484 A1 | 1/2021 | Park et al. |
| 2021/0104773 A1 | 4/2021 | Ozawa et al. |
| 2021/0344041 A1 | 11/2021 | Kawase et al. |

FOREIGN PATENT DOCUMENTS

| | | |
|---|---|---|
| JP | H8-329983 A | 12/1996 |
| JP | 2008-123954 A | 5/2008 |
| JP | 2015-220012 A | 12/2015 |
| JP | 6380254 B2 | 8/2018 |
| JP | 2018-163870 A | 10/2018 |
| JP | 2020-27701 A | 2/2020 |
| KR | 10-2015-0060584 A | 6/2015 |
| KR | 10-2016-0085467 A | 7/2016 |
| KR | 10-2018-0046574 A | 5/2018 |
| KR | 10-1930477 B1 | 12/2018 |
| KR | 10-2020-0018126 A | 2/2020 |
| KR | 10-2020-0049673 A | 5/2020 |
| KR | 10-2020-0050855 A | 5/2020 |
| WO | 2019151363 A1 | 8/2019 |
| WO | 2020166165 | 8/2020 |

*Primary Examiner* — Aiqun Li
(74) *Attorney, Agent, or Firm* — Bryan Cave Leighton Paisner LLP

(57) ABSTRACT

A solid-state battery comprising a positive electrode, a negative electrode, and a solid electrolyte membrane between the positive electrode and the negative electrode, the solid electrolyte membrane including a first solid electrolyte layer and a second solid electrolyte layer, is provided. The first solid electrolyte layer faces the positive electrode and includes a first sulfide-based solid electrolyte, and the second solid electrolyte layer includes a second sulfide-based solid electrolyte having an average particle diameter (D50) larger than an average particle diameter (D50) of the first sulfide-based solid electrolyte.

12 Claims, No Drawings

SOLID-STATE BATTERY

CROSS CITATION WITH RELATED APPLICATION(S)

The present application is a National Stage Application of International Application No. PCT/KR2021/011977, filed on Sep. 3, 2021, which claims priority to Korean Patent Application No. 10-2020-0115643 filed on Sep. 9, 2020, the disclosures of which are incorporated herein by reference in their entirety.

FIELD

The present disclosure relates to a solid-state battery including a solid electrolyte. Particularly, the present disclosure relates to a solid-state battery including a sulfide-based solid electrolyte.

BACKGROUND

As the use of vehicles, computers and portable terminals has been increased, importance of lithium secondary batteries has been increased. Particularly, there is an increasing need for developing a lithium secondary battery capable of providing high energy density with a light weight. Such a lithium secondary battery may be obtained as a lithium-ion battery manufactured by interposing a separator between a positive electrode and a negative electrode and injecting a liquid electrolyte thereto, or as a solid-state battery manufactured by interposing a solid electrolyte membrane between a positive electrode and a negative electrode.

Particularly, a lithium-ion battery using a liquid electrolyte has a structure in which a negative electrode and a positive electrode are defined by a separator, and thus may cause a short-circuit when the separator is damaged by deformation or external impact, resulting in a risk, such as overheating or explosion.

On the other hand, a solid-state battery using a solid electrolyte has enhanced safety and prevents leakage of an electrolyte to improve the reliability of a battery. However, when such a solid-state battery is charged/discharged repeatedly, there has been a problem in that a resistance in the solid electrolyte layer is not constant, and thus lithium ions cannot be plated uniformly on the lithium metal negative electrode. Therefore, lithium dendrite is formed on the lithium metal negative electrode to cause a short-circuit in the cell undesirably.

SUMMARY

The present disclosure is designed to solve the problems of the related art, and therefore the present disclosure is directed to providing a solid-state battery which can control the lithium-ion plating rate uniformly on the lithium metal negative electrode so that lithium ions may be plated uniformly, can reduce dendrite formation and can delay a time point where a short-circuit occurs due to the dendrite formation during cycles.

These and other objects and advantages of the present disclosure may be understood from the following detailed description and will become more fully apparent from the exemplary embodiments of the present disclosure. It will be easily understood that the objects and advantages of the present disclosure may be realized by the means shown in the appended claims and combinations thereof.

In one aspect of the present disclosure, there is provided a solid-state battery according to any one of the following embodiments.

According to the first embodiment, there is provided a solid-state battery which includes a positive electrode, a negative electrode, and a solid electrolyte membrane between the positive electrode and the negative electrode,
wherein the solid electrolyte membrane includes a first solid electrolyte layer and a second solid electrolyte layer,
the first solid electrolyte layer faces the positive electrode,
the first solid electrolyte layer includes a first sulfide-based solid electrolyte,
the second solid electrolyte layer includes a second sulfide-based solid electrolyte, and
the second sulfide-based solid electrolyte has an average particle diameter (D50) larger than an average particle diameter (D50) of the first sulfide-based solid electrolyte.

According to the second embodiment, there is provided the solid-state battery as defined in the first embodiment, wherein the second sulfide-based solid electrolyte has the average particle diameter (D50) 2-7 times larger than the average particle diameter (D50) of the first sulfide-based solid electrolyte.

According to the third embodiment, there is provided the solid-state battery as defined in the first or the second embodiment, wherein the second sulfide-based solid electrolyte has an average particle diameter (D50) of 1 μm or more and 4 μm or less.

According to the fourth embodiment, there is provided the solid-state battery as defined in any one of the first to the third embodiments, wherein the first sulfide-based solid electrolyte has an average particle diameter (D50) of 100 nm or more and 1,000 nm or less.

According to the fifth embodiment, there is provided the solid-state battery as defined in any one of the first to the fourth embodiments, wherein a content of the second sulfide-based solid electrolyte is larger than a content of the first sulfide-based solid electrolyte.

According to the sixth embodiment, there is provided the solid-state battery as defined in any one of the first to the fifth embodiments, wherein the content of the second sulfide-based solid electrolyte is 95 parts by weight or more based on 100 parts by weight of the second sulfide-based solid electrolyte layer, and
the content of the first sulfide-based solid electrolyte is 81-95 parts by weight or more based on 100 parts by weight of the first sulfide-based solid electrolyte layer.

According to the seventh embodiment, there is provided the solid-state battery as defined in any one of the first to the sixth embodiments, wherein the second solid electrolyte layer has a lower resistance than a resistance of the first solid electrolyte layer.

According to the eighth embodiment, there is provided the solid-state battery as defined in any one of the first to the seventh embodiments, wherein the first solid electrolyte layer has the same thickness as the second solid electrolyte layer.

According to the ninth embodiment, there is provided the solid-state battery as defined in any one of the first to the eighth embodiments, wherein each of the first sulfide-based solid electrolyte and the second sulfide-based solid electrolyte contains sulfur (S) and has ion conductivity of a metal that belongs to Group 1 or Group 2 in the Periodic Table, and the first sulfide-based solid electrolyte is represented by the same chemical formula as the second sulfide-based solid electrolyte.

According to the tenth embodiment, there is provided the solid state battery as defined in any one of the first to the ninth embodiments, wherein each of the first sulfide-based solid electrolyte and the second sulfide-based solid electrolyte is any one selected from the group consisting of $Li_2S$—$P_2S_5$, $Li_2S$—$LiI$—$P_2S_5$, $Li_2S$—$P_2S_5$—$LiCl$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$ and $Li_2S$—$GeS_2$—$ZnS$, and the first sulfide-based solid electrolyte is represented by the same chemical formula as the second sulfide-based solid electrolyte.

According to the eleventh embodiment, there is provided the solid-state battery as defined in any one of the first to the tenth embodiments,
wherein the first sulfide-based solid electrolyte has a particle diameter of 100-500 nm,
the second sulfide-based solid electrolyte has a particle diameter of 2-4 μm,
the content of the first sulfide-based solid electrolyte is 90 parts by weight or more based on 100 parts by weight of the first sulfide-based solid electrolyte layer, and
the content of the second sulfide-based solid electrolyte is 95 parts by weight or more based on 100 parts by weight of the second sulfide-based solid electrolyte layer.

According to the twelfth embodiment, there is provided the solid-state battery as defined in any one of the first to the eleventh embodiments,
wherein the first solid electrolyte layer has an ion conductivity of $1 \times 10^4$ S/cm or more, and
the second solid electrolyte layer has an ion conductivity of $1 \times 10^4$ S/cm or more.

According to the thirteenth embodiment, there is provided the solid-state battery as defined in any one of the first to the twelfth embodiments, of which a time point where a short-circuit occurs is after $80^{th}$ cycle, when being charged at 0.1 C to 4.25 V in a constant current-constant voltage (CCCV) mode (0.05 C cut-off) and discharged at 0.1 C to 3 V cut-off in a constant current (CC) mode.

According to an embodiment of the present disclosure, there is provided a solid-state battery including a sulfide-based solid electrolyte layer having a multilayer structure. Particularly, the solid electrolyte layer facing the positive electrode is controlled to have a resistance different from a resistance of the solid electrolyte layer facing the negative electrode so that the lithium-ion plating rate may be controlled. Particularly, the first solid electrolyte layer facing the positive electrode is controlled to have a higher resistance. In this manner, it is possible to reduce the lithium-ion release rate from the positive electrode. On the other hand, the second solid electrolyte layer facing the negative electrode is controlled to have a lower resistance. In this manner, it is possible to maintain the rate of lithium ions passing through the first solid electrolyte layer, and thus to allow lithium to be plated uniformly on the lithium metal negative electrode.

In other words, according to an embodiment of the present disclosure, the first solid electrolyte layer has a higher resistance value as compared to the second solid electrolyte layer, but the first and the second solid electrolyte layers include the same sulfide-based solid electrolyte despite such a difference in resistance. That is to say, according to an embodiment of the present disclosure, even though the first solid electrolyte and the second solid electrolyte are represented by the same chemical formula, they may be controlled to have different resistance values. Particularly, the solid-state battery according to an embodiment of the present disclosure includes the first sulfide-based solid electrolyte layer and the second sulfide-based solid electrolyte layer, wherein the first sulfide-based solid electrolyte contained in the first sulfide-based solid electrolyte layer and the second sulfide-based solid electrolyte contained in the second sulfide-based solid electrolyte layer are represented by the same chemical formula, but each of the sulfide-based solid electrolytes has a different average particle diameter or different content so that the second solid electrolyte layer may have a lower resistance value than a resistance value of the first solid electrolyte layer.

In this manner, it is possible to improve the cycle characteristics of the solid-state battery by reducing dendrite formation by virtue of the resistance of the first solid electrolyte layer higher than the resistance of the second solid electrolyte layer. In other words, it is possible to delay a time point where a shirt-circuit occurs due to dendrite formation while repeating cycles.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'about', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a solid-state battery including a sulfide-based solid electrolyte.

A solid-state battery using a solid electrolyte has enhanced safety and prevents leakage of an electrolyte to improve the reliability of a battery. However, when such a solid-state battery is charged/discharged repeatedly, there has been a problem in that the resistance in the solid electrolyte layer is not constant, and thus lithium ions cannot be plated uniformly on the lithium metal negative electrode. Therefore, lithium dendrite is formed on the lithium metal negative electrode to cause a short-circuit in the cell undesirably.

To solve the above-mentioned problem, the inventors of the present disclosure have conducted intensive studies about a method for controlling the lithium-ion plating rate on a lithium metal negative electrode uniformly. Particularly, according to the present disclosure, the solid electrolyte layer facing the positive electrode is controlled to have a resistance different from a resistance of the solid electrolyte layer facing the negative electrode so that the lithium-ion plating rate may be controlled. More particularly, the first solid electrolyte layer facing the positive electrode is controlled to have a higher resistance. In this manner, it is possible to reduce the lithium-ion release rate from the positive electrode. On the other hand, the second solid electrolyte layer is controlled to have a lower resistance. In this manner, it is possible to maintain the rate of lithium ions passing through the first solid electrolyte layer, and thus to allow lithium to be plated uniformly on the lithium metal negative electrode.

In other words, according to an embodiment of the present disclosure, the first solid electrolyte layer has a higher resistance value as compared to the second solid electrolyte layer, but the first and the second solid electrolyte layers include the same sulfide-based solid electrolyte despite such a difference in resistance. That is to say, according to an embodiment of the present disclosure, even though the first solid electrolyte and the second solid electrolyte are represented by the same chemical formula, they may be controlled to have different resistance values. Particularly, the solid-state battery according to an embodiment of the present disclosure includes the first sulfide-based solid electrolyte layer and the second sulfide-based solid electrolyte layer, wherein the first sulfide-based solid electrolyte contained in the first sulfide-based solid electrolyte layer and the second sulfide-based solid electrolyte contained in the second sulfide-based solid electrolyte layer are represented by the same chemical formula, but each of the sulfide-based solid electrolytes has a different average particle diameter or different content so that the second solid electrolyte layer may have a lower resistance value than the resistance value of the first solid electrolyte layer.

In this manner, it is possible to improve the cycle characteristics of the solid-state battery by reducing dendrite formation by virtue of the resistance of the first solid electrolyte layer higher than the resistance of the second solid electrolyte layer. In other words, it is possible to delay a time point where a short-circuit occurs due to the dendrite formation while repeating cycles.

Meanwhile, according to the present disclosure, a sulfide-based solid electrolyte is used to solve the above-mentioned problem. The reason is as follows.

Solid electrolytes may be classified broadly into polymeric solid electrolytes, sulfide-based solid electrolytes and oxide-based solid electrolytes. Among them, the polymeric solid electrolyte is disadvantageous in that it has low ion conductivity, and different types of polymeric solid electrolytes should be used in order to control ion conductivity differently. The oxide-based solid electrolyte has an advantage in that it has significantly higher chemical stability as compared to the other solid electrolytes. However, it is problematic in that it has poor moldability to form a multilayer structure. On the other hand, the sulfide-based solid electrolyte has high moldability at room temperature. In addition, even when using the same sulfide-based solid electrolyte represented by the same chemical formula, it is possible to control ion conductivity or resistance differently by adjusting the other factors. Further, the sulfide-based solid electrolyte has higher ion conductivity as compared to the oxide-based solid electrolyte.

Hereinafter, the present disclosure will be explained in more detail.

In one aspect of the present disclosure, there is provided a solid-state battery which includes a positive electrode, a negative electrode, and a solid electrolyte membrane between the positive electrode and the negative electrode,
wherein the solid electrolyte membrane includes a first solid electrolyte layer and a second solid electrolyte layer,
the first solid electrolyte layer faces the positive electrode,
the first solid electrolyte layer includes a first sulfide-based solid electrolyte,
the second solid electrolyte layer includes a second sulfide-based solid electrolyte, and
the second sulfide-based solid electrolyte has an average particle diameter (D50) larger than an average particle diameter (D50) of the first sulfide-based solid electrolyte.

When a solid-state battery is charged, lithium ions are deposited on the negative electrode through the solid electrolyte membrane. The deposited lithium is grown in the form of dendrite and reaches the interface with the positive electrode to cause a short-circuit undesirably. However, according to the present disclosure, since the second sulfide-based solid electrolyte has a larger average particle diameter (D50) as compared to the first sulfide-based solid electrolyte, dendrite is grown in the horizontal direction rather than the vertical direction, and thus does not reach the positive electrode. Therefore, the dendrite phase does not penetrate through the solid electrolyte membrane and does not cause an internal short-circuit. As a result, it is possible to provide a solid-state battery which ensures safety.

Throughout the specification, 'average particle diameter' refers to a particle diameter corresponding to 50% of volume accumulation in a particle diameter distribution curve. For example, the average diameter (D50) of particles may be determined by using a laser diffraction method. The laser diffraction method can determine a particle diameter ranging from the submicron region to several mm and provide results with high reproducibility and high resolution.

The second sulfide-based solid electrolyte has the average particle diameter (D50) 2-7 times, particularly 3-7 times, larger than the average particle diameter (D50) of the first sulfide-based solid electrolyte.

According to an embodiment of the present disclosure, the second sulfide-based solid electrolyte may have an average particle diameter of 1 μm or more, 1.5 μm or more, or 2 μm or more, and 4 μm or less, 3.5 μm or less, or 3.0 μm or less.

According to an embodiment of the present disclosure, the first sulfide-based solid electrolyte may have an average particle diameter of 100 nm or more, 200 nm or more, or 300 nm or more, and 1,000 nm or less, 900 nm or less, 800 nm or less, or 700 nm or less.

According to an embodiment of the present disclosure, a content of the second sulfide-based solid electrolyte is larger than a content of the first sulfide-based solid electrolyte. Herein, the content of the second sulfide-based solid electrolyte may be 95 parts by weight or more based on 100 parts by weight of the second sulfide-based solid electrolyte layer, and the content of the first sulfide-based solid electrolyte may be 81 parts by weight or more, 82 parts by weight or more, or 85 parts by weight or more, and 95 parts by weight or less, 93 parts by weight or less, or 90 parts by weight or less, based on 100 parts by weight of the first sulfide-based solid electrolyte layer. However, the scope of the present disclosure is not limited thereto. The adequate content of the first solid electrolyte or that of the second solid electrolyte may vary depending on the particle diameter of the first or the second solid electrolyte.

Herein, the first solid electrolyte layer may have the same thickness as the second solid electrolyte layer, or the first solid electrolyte layer may have a thickness larger than the thickness of the second solid electrolyte layer.

Herein, each of the first sulfide-based solid electrolyte and the second sulfide-based solid electrolyte contains sulfur (S) and has ion conductivity of a metal that belongs to Group 1 or Group 2 in the Periodic Table, and the first sulfide-based solid electrolyte is represented by the same chemical formula as the second sulfide-based solid electrolyte.

Particularly, each of the first sulfide-based solid electrolyte and the second sulfide-based solid electrolyte is any one selected from the group consisting of $Li_2S$—$P_2S_5$, $Li_2S$—$LiI$—$P_2S_5$, $Li_2S$—$P_2S_5$—$LiCl$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$ and $Li_2S$—$GeS_2$—$ZnS$, and the first sulfide-based solid electrolyte is represented by the same chemical formula as the second sulfide-based solid electrolyte.

According to the present disclosure, the negative electrode may include a current collector, and a negative electrode active material layer formed on the surface of the current collector, wherein the negative electrode active material layer may include at least one element that belongs to alkali metals, alkaline earth metal, Group 3B metals and transition metals. According to an embodiment of the present disclosure, non-limiting examples of the alkali metals include at least one metal selected from the group consisting of lithium (Li), sodium (Na), potassium (K), rubidium (Rb), cesium (Cs) and francium (Fr), preferably lithium. According to an embodiment of the present disclosure, the negative electrode may be obtained by binding and stacking the negative electrode current collector with lithium metal foil having a predetermined thickness by compression.

According to the present disclosure, the positive electrode includes a current collector and a positive electrode active material layer formed on at least one surface of the current collector, wherein the positive electrode active material layer includes a positive electrode active material, a solid electrolyte and a conductive material. In addition, according to an embodiment of the present disclosure, the positive electrode active material layer may further include a binder material. It is possible to increase the binding force between the positive electrode active material layer and the current collector and/or solid electrolyte layer by introducing the binder material. In dependently from or in combination with this, it is possible to improve the binding force among the ingredients contained in the positive electrode active material layer.

The positive electrode active material may be any material used conventionally as a positive electrode active material for a lithium-ion secondary battery. For example, the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; lithium nickel oxides represented by the chemical formula of $LiNi_{1-x}M_xO_2$ (wherein M is Co, Mn, Al, Cu, Fe, Mg, B or Ga, and x is 0.01-0.3), such as $LiNi_{0.8}Co_{0.18}M_{0.1}O_2$; lithium manganese composite oxides represented by the chemical formula of $LiMn_{2-x}M_xO_2$ (wherein M is Co, Ni, Fe, Cr, Zn or Ta, and x is 0.01-0.1), or $Li_2Mn_3MO_8$ (wherein M is Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as vapor grown carbon fibers (VGCF) or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

The binder material is not particularly limited, as long as it is an ingredient which assists binding of the active material with the conductive material, and binding to the current collector. Particular examples of the binder material include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer terpolymer (EPDM), sulfonated EPDM, styrene butadiene rubber, fluororubber, various copolymers, or the like. In general, the binder material may be used in an amount of 1-30 wt %, or 1-10 wt %, based on 100 wt % of electrode active material layer.

The negative electrode may include lithium metal or lithium alloy as a negative electrode active material. Particular examples of the lithium alloy include alloys of lithium with at least one metal selected from Na, K, Rb, Cs, Fr, Be, Mg, Ca, Sr, Ba, ra, Al and Sn.

In addition, the negative electrode current collector is not particularly limited, as long as it has high conductivity, while not causing any chemical change in the solid-state battery. Particular examples of the negative electrode current collector include copper, stainless steel, aluminum, nickel, titanium, baked carbon, copper or stainless steel surface-treated with carbon, nickel, titanium, silver, etc., aluminum-cadmium alloy, or the like. In addition, similarly to the positive electrode current collector, fine surface irregularities may be formed on the surface of the negative electrode current collector, and the negative electrode current collector may be used in various shapes, including a film, a sheet, a foil, a net, a porous body, a foamed body, a non-woven web, or the like.

According to an embodiment of the present disclosure, the negative electrode and/or positive electrode may further include various additives in order to supplement or improve physical properties. The additives are not particularly limited but may include at least one additive, such as an oxidation stabilizing additive, a reduction stabilizing additive, a flame retardant, a heat stabilizer, an anti-fogging agent, or the like, if necessary.

In addition, the current collector generally has a thickness of 3-500 μm. The current collector is not particularly limited, as long as it causes no chemical change in the corresponding battery and has high conductivity. Particular examples of the current collector may include copper, stainless steel, aluminum, nickel, titanium, baked carbon, or stainless steel surface-treated with carbon, nickel, titanium, silver, or the like. The current collector may be selected from the above-mentioned materials suitably depending on the polarity of the electrode (positive electrode or negative electrode).

According to an embodiment of the present disclosure, the solid electrolyte membrane may be obtained as follows, but is not limited thereto.

First, a first solid electrolyte layer and a second solid electrolyte layer are prepared.

Each of the first solid electrolyte layer and the second solid electrolyte layer includes an ion conductive solid electrolyte material (a), and for example, may be used as an ion conductive electrolyte for a solid-state battery using no liquid electrolyte. Each of the first solid electrolyte layer and the second solid electrolyte layer may have an ion conductivity of $1 \times 10^{-5}$ S/cm or more, or $1 \times 10^{-4}$ S/cm or more. Herein, each solid electrolyte layer may have a different ion conductivity value. In addition, the solid electrolyte material is a sulfide-based solid electrolyte.

Meanwhile, according to an embodiment of the present disclosure, when the solid electrolyte membrane uses a polymeric material as an electrolyte material of a solid electrolyte layer, a crosslinking agent and/or an initiator may be further used for preparing the solid electrolyte layer. The crosslinking agent and/or the initiator is not particularly limited, as long as it can initiate crosslinking or polymerization depending on heat, light and/or temperature conditions to induce crosslinking and/or polymerization. According to an embodiment of the present disclosure, the crosslinking agent and/or the initiator may include an organic peroxide, an organometal reagent, such as alkylated silver, azo compounds, or the like, but is not limited thereto.

For example, the first solid electrolyte may be prepared by mixing the first sulfide-based solid electrolyte with a binder polymer solution in a solvent to prepare slurry, and applying the resultant mixed slurry onto a release film, followed by drying, and removing the release film.

For example, the second solid electrolyte may be prepared by mixing the second sulfide-based solid electrolyte with a binder polymer solution in a solvent to prepare slurry, and applying the resultant mixed slurry onto a release film, followed by drying, and removing the release film.

Then, the resultant first solid electrolyte layer is allowed to face a positive electrode, while allowing the second solid electrolyte layer to face a negative electrode to obtain a solid-state battery.

The methods for manufacturing a solid-state battery having the above-described structural characteristics are not particularly limited, and any known methods may be used.

For example, the solid electrolyte membrane is interposed between the positive electrode and the negative electrode, and the resultant structure is press-molded to assemble a cell.

Hereinafter, the present disclosure will be explained in detail with reference to Examples. However, the following Examples are illustrative purposes only, and the scope of the present disclosure is not limited thereto.

Example 1

Manufacture of Solid Electrolyte Membrane
(1) Preparation of First Solid Electrolyte Layer and Second Solid Electrolyte Layer The first solid electrolyte layer was prepared as follows.

First, sulfide-based solid electrolyte ($Li_2S$—$P_2S_5$—$LiCl$) powder was mixed with a binder solution at a weight ratio of 95:5 in acetonitrile (AN) as a solvent to prepare slurry. The binder solution was prepared by dissolving a styrene butadiene rubber (SBR)-based binder polymer to a solid content of 8 wt %. The mixed slurry was applied and coated onto a release film by using a doctor blade. The coating gap and coating rate were set to 250 μm and 20 mm/min, respectively. The release film coated with the slurry was transferred to a glass plate and allowed to remain levelled, dried overnight at room temperature, and then vacuum dried at 100° C. for 12 hours.

The second solid electrolyte layer was prepared as follows.

First, sulfide-based solid electrolyte ($Li_2S$—$P_2S_5$—$LiCl$) powder was mixed with a binder solution at a weight ratio of 95:5 in acetonitrile (AN) as a solvent to prepare slurry. The binder solution was prepared by dissolving a styrene butadiene rubber (SBR)-based binder polymer to a solid content of 8 wt %. The mixed slurry was applied and coated onto a release film by using a doctor blade. The coating gap and coating rate were set to 250 μm and 20 mm/min, respectively. The release film coated with the slurry was transferred to a glass plate and allowed to remain levelled, dried overnight at room temperature, and then vacuum dried at 100° C. for 12 hours.

Each of the first solid electrolyte layer and the second solid electrolyte layer had a thickness of about 50 μm.

Manufacture of Positive Electrode

To prepare slurry, NCM811 ($LiNi_{0.8}Co_{0.1}Mn_{0.1}O_2$) as an electrode active material, vapor grown carbon fibers (VGCF) as a conductive material and a sulfide-based electrolyte ($Li_2S$—$P_2S_5$—$LiCl$) and a binder (SBR) were mixed at a weight ratio of 77.6:1.5:19.4:1.5, and the resultant mixture was introduced to acetonitrile and agitated therein to form electrode slurry. The electrode slurry was applied onto an aluminum current collector having a thickness of 20 μm by using a doctor blade, and the resultant structure was vacuum dried at 120° C. for 4 hours. Then, the vacuum dried product was subjected to a pressing step using cold iso-pressure (CIP) to obtain an electrode having an electrode loading of 4 mAh/$cm^2$, electrode layer thickness of 128 μm and a porosity of 15%.

Manufacture of Battery

The positive electrode obtained as described above was cut into a square shape having an area of 4 $cm^2$. Lithium metal foil cut into a circular shape having an area of 6.25 $cm^2$ was prepared as a negative electrode. The solid electrolyte membrane was interposed between the positive electrode and the negative electrode to obtain a mono-cell (half-cell). Herein, the solid electrolyte membrane was interposed in such a manner that the first solid electrolyte layer might face the positive electrode and the second solid electrolyte layer might face the negative electrode, and the cell was assembled through a CIP process.

The results are shown in the following Table 1.

TABLE 1

| | First solid electrolyte layer | | | | Second solid electrolyte layer | | | | | |
|---|---|---|---|---|---|---|---|---|---|---|
| | Type of first solid electrolyte | Average particle diameter of first solid electrolyte | Content of first solid electrolyte (parts by weight) (based on 100 parts by weight of first solid electrolyte layer) | Ion conductivity of first solid electrolyte layer (S/cm) | Type of second solid electrolyte | Average particle diameter of second solid electrolyte | Content of second solid electrolyte (parts by weight) (based on 100 parts by weight of second solid electrolyte layer) | Ion conductivity of second solid electrolyte layer (S/cm) | Ion conductivity of solid electrolyte membrane (S/cm) | Time point where short-circuit occurs during Li metal mono-cell cycles |
| Ex. 1 | LPSCl | 0.5 μm | 95 | 4*10$^{-4}$ | LPSCl | 3 μm | 95 | 6*10$^{-4}$ | 5*10$^{-4}$ | 95$^{th}$ cycle |
| Ex. 2 | LPSCl | 0.5 μm | 95 | 4*10$^{-4}$ | LPSCl | 3 μm | 97 | 2.6*10$^{-3}$ | 2.4*10$^{-3}$ | 121$^{st}$ cycle |
| Ex. 3 | LPSCl | 0.5 μm | 93 | 1.2*10$^{-4}$ | LPSCl | 3 μm | 97 | 2.6*10$^{-3}$ | 9*10$^{-4}$ | 105$^{th}$ cycle |
| Comp. Ex. 1 | LPSCl | 0.5 μm | 95 | 4*10$^{-4}$ | LPSCl | 0.5 μm | 95 | 4*10$^{-4}$ | 4*10$^{-4}$ | 65$^{th}$ cycle |
| Comp. Ex. 2 | LPSCl | 3 μm | 95 | 6*10$^{-4}$ | LPSCl | 3 μm | 95 | 6*10$^{-4}$ | 6*10$^{-4}$ | 75$^{th}$ cycle |
| Comp. Ex. 3 | LPSCl | 3 μm | 95 | 6*10$^{-4}$ | LPSCl | 0.5 μm | 95 | 4*10$^{-4}$ | 5*10$^{-4}$ | 70$^{th}$ cycle |
| Comp. Ex. 4 | LPSCl | 0.5 μm | 80 | 5.2*10$^{-5}$ | LPSCl | 0.5 μm | 80 | 5.2*10$^{-5}$ | 5.2*10$^{-5}$ | 10$^{th}$ cycle |
| Comp. Ex. 5 | LPSCl | 3 μm | 95 | 6*10$^{-4}$ | LPSCl | 3 μm | 93 | 2.1*10$^{-4}$ | 4.5*10$^{-4}$ | 68$^{th}$ cycle |

Examples 2 and 3

Solid-state batteries were obtained in the same manner as Example 1, except that the average particle diameter and content of the first solid electrolyte, and the average particle diameter and content of the second solid electrolyte were controlled as shown in Table 1.

Comparative Examples 1-5

Solid-state batteries were obtained in the same manner as Example 1, except that the average particle diameter and content of the first solid electrolyte, and the average particle diameter and content of the second solid electrolyte were controlled as shown in Table 1.

Method for Determining Ion Conductivity

Each of the solid electrolyte membranes was interposed between the positive electrode and the negative electrode, and the ion conductivity was calculated according to the following Formula 1 by using the alternate current impedance method. Herein, both sides of the solid electrolyte and each electrode were fixed and pressurized with a polyetheretherketone column.

$$\sigma = l/RA$$ (l: pellet length, R: resistance value, A: pellet area) [Formula 1]

Chemical Composition Analysis of Sulfide-Based Solid Electrolyte (ICP-AES)

To analyze the chemical composition of the sulfide-based solid electrolyte used according to the present disclosure, inductively coupled plasma-atomic emission spectroscopy (ICP-AES) was carried out. Each sample was pulverized and introduced to a glass vial, dissolved with nitric acid, and decomposed completely by using hydrogen peroxide. Each sample was diluted to three different volumes, and elemental analysis was performed by the standard method using ICP-AES (GDC Integra XMP).

Time Point Where Short-Circuit Occurs During Li Metal Mono-Cell Cycles

The mono-cells according to Examples and Comparative Examples were compared with one another in terms of cycle performance at 60° C. and 0.1 C/0.1 C to determine the short-circuit generation degree based on the time point where a short-circuit occurs in each cell. Each cell was charged at 0.1 C to 4.25 V in a constant current-constant voltage (CCCV) mode (0.05 C cut-off) and discharged at 0.1 C to 3 V cut-off in a CC mode.

Referring to Table 1, in the case of Example 1, the second solid electrolyte has a larger average particle diameter as compared to the first solid electrolyte. It can be seen that Example 1 exhibits a higher ion conductivity and a later time point where a short-circuit occurs, as compared to Comparative Example 1 wherein the first solid electrolyte has the same average particle diameter as the second solid electrolyte. This is because the first solid electrolyte in the first solid electrolyte layer facing the positive electrode has a smaller average particle diameter than the average particle diameter of the second solid electrolyte in the second solid electrolyte layer facing the negative electrode, and the first solid electrolyte layer has a higher resistance value as compared to the second solid electrolyte layer to cause a decrease in lithium-ion release rate from the positive electrode, while maintaining the release rate of lithium ions passing through the second solid electrolyte layer at the rate of lithium ions passing through the first solid electrolyte layer, and thus lithium is plated uniformly on the lithium metal negative electrode.

In the case of Examples 2 and 3, the first and the second solid electrolytes have the same average particle diameter, and the content of the second solid electrolyte is higher than the content of the first solid electrolyte, unlike Example 1. Particularly, the content of the first solid electrolyte in the first solid electrolyte layer is reduced, and thus the first solid electrolyte layer has a relatively increased resistance value as compared to Example 1. Therefore, the lithium-ion conduction rate may be controlled effectively, and thus lithium is plated more uniformly on the lithium metal negative electrode.

Meanwhile, when comparing Example 2 with Example 3, the content of the first solid electrolyte in Example 3 is smaller than the content of the first solid electrolyte in Example 2, and thus the first solid electrolyte layer according to Example 2 exhibits a higher ion conductivity as compared to the first solid electrolyte layer according to Example 3. As a result, the solid electrolyte membrane according to Example 2 exhibits a higher ion conductivity and later time point where a short-circuit occurs, as compared to the solid electrolyte membrane according to Example 3.

In the case of Comparative Example 1, the average particle size and content of each of the first and the second solid electrolytes are the same, unlike Example 1. In this case, the first solid electrolyte layer exhibits the same ion conductivity as the second solid electrolyte. Therefore, it is not possible to control the lithium-ion plating rate. As result, it can be seen that Comparative Example 1 exhibits a relatively earlier time point ($65^{th}$ cycle) where dendrite is formed and a short-circuit occurs.

In the case of Comparative Example 2, the solid electrolyte has a larger average particle diameter as compared to Comparative Example 1. In this case, the ion conductivity of the solid electrolyte membrane itself may be improved as compared to Example 1. However, the two solid electrolyte layers have the same ion conductivity, and the lithium-ion conduction rate cannot be controlled. As a result, it can be seen that it is not possible to delay the dendrite formation rate.

In the case of Comparative Example 3, the first solid electrolyte has a larger average particle diameter as compared to the second solid electrolyte, unlike Example 1. In this case, the lithium-ion conduction rate in the second solid electrolyte layer is lower than the lithium-ion conduction rate in the first solid electrolyte layer. As a result, it can be seen that more dendrites are formed on the negative electrode surface layer, and a short-circuit occurs at an earlier time point.

In the case of Comparative Example 4, each of the first solid electrolyte and the second solid electrolyte has the same particle diameter unlike Example 1, and the content of solid electrolyte is 80 parts by weight, which is significantly lower as compared to Example 1. In this case, the ion conductivity itself is about 10 times lower than the ion conductivity according to Example 1, and the cell resistance is increased rapidly. As a result, it can be seen that more dendrites are formed on the negative electrode surface layer, and a short-circuit occurs at an earlier time point.

In the case of Comparative Example 5, the content of the second solid electrolyte is smaller than the content of the first solid electrolyte, unlike Comparative Examples 2 and 3. Particularly, since the content of the second solid electrolyte is reduced, the first solid electrolyte exhibits a higher ion conductivity as compared to the second solid electrolyte. As a result, it can be seen that more dendrites are formed on the negative electrode surface layer, and a short-circuit occurs at an earlier time.

What is claimed is:

1. A solid-state battery comprising:
a positive electrode;
a negative electrode; and
a solid electrolyte membrane between the positive electrode and the negative electrode,
wherein the solid electrolyte membrane comprises a first solid electrolyte layer and a second solid electrolyte layer,
wherein the first solid electrolyte layer faces the positive electrode and comprises a first sulfide-based solid electrolyte,
wherein the second solid electrolyte layer comprises a second sulfide-based solid electrolyte having an average particle diameter (D50) larger than an average particle diameter (D50) of the first sulfide-based solid electrolyte,
wherein a resistance of the second solid electrolyte layer is lower than a resistance of the first solid electrolyte layer.

2. The solid-state battery according to claim 1, wherein the average particle diameter (D50) of the second sulfide-based solid electrolyte is 2-7 times larger than the average particle diameter (D50) of the first sulfide-based solid electrolyte.

3. The solid-state battery according to claim 1, wherein the average particle diameter (D50) of the second sulfide-based solid electrolyte is 1 μm or more and 4 μm or less.

4. The solid-state battery according to claim 1, wherein the average particle diameter (D50) of the first sulfide-based solid electrolyte is 100 nm or more and 1,000 nm or less.

5. The solid-state battery according to claim 1, wherein a content of the second sulfide-based solid electrolyte is larger than a content of the first sulfide-based solid electrolyte.

6. The solid-state battery according to claim 5, wherein the content of the second sulfide-based solid electrolyte is 95 parts by weight or more based on 100 parts by weight of the second sulfide-based solid electrolyte layer, and
the content of the first sulfide-based solid electrolyte is 81-95 parts by weight or more based on 100 parts by weight of the first sulfide-based solid electrolyte layer.

7. The solid-state battery according to claim 1, wherein the first solid electrolyte layer has the same thickness as the second solid electrolyte layer.

8. The solid-state battery according to claim 1, wherein each of the first sulfide-based solid electrolyte and the second sulfide-based solid electrolyte contains sulfur(S) and has ion conductivity of a metal that belongs to Group 1 or Group 2 in the Periodic Table, and the first sulfide-based solid electrolyte and the second sulfide-based solid electrolyte are represented by the same chemical formula.

9. The solid-state battery according to claim 8, wherein each of the first sulfide-based solid electrolyte and the second sulfide-based solid electrolyte is any one selected from the group consisting of $Li_2S$—$P_2S_5$, $Li_2S$—$LiI$—$P_2S_5$, $Li_2S$—$P_2S_5$—$LiCl$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$ and $Li_2S$—$GeS_2$—$ZnS$, and
wherein the first sulfide-based solid electrolyte and the second sulfide-based solid electrolyte are represented by the same chemical formula.

10. The solid-state battery according to claim 1, wherein the first sulfide-based solid electrolyte has a particle diameter of 100-500 nm,
wherein the second sulfide-based solid electrolyte has a particle diameter of 2-4 μm,
wherein a content of the first sulfide-based solid electrolyte is 90 parts by weight or more based on 100 parts by weight of the first sulfide-based solid electrolyte layer, and
wherein a content of the second sulfide-based solid electrolyte is 95 parts by weight or more based on 100 parts by weight of the second sulfide-based solid electrolyte layer.

11. The solid-state battery according to claim 1, wherein the first solid electrolyte layer has an ion conductivity of $1 \times 10^4$ S/cm or more, and the second solid electrolyte layer has an ion conductivity of $1 \times 10^4$ S/cm or more.

12. The solid-state battery according to claim 1, of which a time point where a short-circuit occurs is after $80^{th}$ cycle, when being charged at 0.1 C to 4.25 V in a constant current-constant voltage (CCCV) mode (0.05 C cut-off) and discharged at 0.1 C to 3 V cut-off in a constant current (CC) mode.

* * * * *